3,078,292
Patented Feb. 19, 1963

3,078,292
HYDROLYZABLE SILYL THIOETHERS
Maurice Prober, Schenectady, N.Y., assignor to General Electric Company, a corporation of New York
No Drawing. Filed May 13, 1958, Ser. No. 734,815
8 Claims. (Cl. 260—448.2)

This application is a continuation-in-part of my application Serial No. 401,703, filed December 31, 1953, and assigned to the same assignee as the present invention, now U.S. Patent 2,835,690 issued May 20, 1958.

The present invention relates to hydrolyzable sulfur-containing organosilicon compounds which are useful in the preparation of sulfur-containing organopolysiloxanes. More particularly, the present invention relates to hydrolyzable silyl thioethers comprising a silane atom to which is bonded at least one hydrolyzable group and at least one thioether radical, with any remaining valences of silicon being satisfied by hydrocarbon radicals free of olefinic unsaturation.

In particular, the present invention relates to hydrolyzable silyl thioethers having the formula (1)     $(RSR')_m Si(R'')_n (X)_{4-(m+n)}$ where R and R'' represent hydrocarbon radicals free of olefinic unsaturation, including alkyl radicals, e.g., methyl, ethyl, propyl, butyl, octyl, dodecyl, octadecyl, etc. radicals; cycloalkyl radicals, e.g., cyclohexyl, cycloheptyl, etc. radicals; aryl radicals, e.g., phenyl, biphenylyl naphthyl, tolyl, xylyl, etc. radicals; aralkyl radicals, e.g., benzyl, phenylethyl, etc. radicals. In the above formula R' represents a divalent alkylene radical containing at least two carbon atoms, e.g., ethylene, propylene, isopropylene, butylene, etc, radicals; X represents a hydrolyzable group including halogen atoms, e.g., chlorine, bromine, etc. groups, the OR'' group, where R'' is as defined above, including, for example, alkoxy groups, e.g., methoxy, ethoxy, propoxy, etc. groups; aryloxy radicals, e.g., phenoxy, etc. radicals, acyloxy groups, e.g., acetoxy, propionoxy, etc. groups. In the above formula $m$ is a whole number equal to from 1 to 3, inclusive, $n$ is a whole number equal to from 0 to 2, inclusive, and the sum of $m+n$ is at most 3.

The preferred group of compounds within the scope of the present invention are those having the formula (2)     $RSCH_2CH_2Si(R'')(X)_2$ in which the R radical is an aryl radical such as a phenyl radical or a lower alkyl radical having from 1 to 7 carbon atoms and X is chlorine or ethoxy.

The products of the present invention can be prepared by adding a mercaptan having the formula (3)     RSH where R is as defined above, across the double bond of a silane containing at least one silicon-bonded olefinically unsaturated hydrocarbon radical and at least one silicon-bonded hydrolyzable group with any remaining valences of silicon being satisfied by hydrocarbon radicals free of olefinic unsaturation. In this reaction the mercapto group becomes attached to the olefinic carbon farthest removed from the silicon atom and the hydrogen becomes attached to the other olefinic carbon atom.

The mercaptans within the scope of Formula 3 which are useful as starting materials in the practice of the present invention are well known compounds and include, for example, methyl mercaptan, ethyl mercaptan, butyl mercaptan, dodecyl mercaptan, cyclohexyl mercaptan, phenyl mercaptan, benzyl mercaptan, tolyl mercaptan, naphthyl mercaptan, etc.

The olefinically unsaturated organosilicon compounds useful in the practice of the present invention are also well known in the art and include such specific compounds as vinyl trichlorosilane, vinyl tribromosilane, methylvinyl diethoxysilane, methylphenyl vinyl acetoxysilane, allyl trichlorosilane, diallyl dichlorosilane, dimethyl allyl acetoxy silane, diphenyl methylallyl chlorosilane, trivinyl methoxysilane, etc. The vinyl substituted silanes employed in the practice of the present invention may be prepared, for example, by the method shown in U.S. Patent 2,420,912—Hurd. Additional methods for the preparation of vinyl-substituted silanes, allyl-substituted silanes, and other silanes containing olefinically unsaturated hydrocarbon substituents are described in "An Introduction to the Chemistry of Silicones" by E. G. Rochow, John Wiley & Sons, Incorporated, New York, pages 55–60, second edition (1951). Among the numerous methods for the preparation of the olefinically unsaturated hydrolyzable silanes is the reaction of a halide of an olefin with heated silicon in the presence of a copper catalyst. Another method of the preparation of these olefinically-substituted silanes is the chlorination of an alkyl-substituted silane with the subsequent dehydrochlorination of the chlorinated alkyl radical.

One particularly useful method for the preparation of the hydrolyzable silyl thioethers of the present invention is the method described in my aforementioned patent which comprises adding a mercaptan to an alkoxy silane containing a silicon-bonded olefinically unsaturated radical in the presence of a basic catalyst such as a sodium alkyl mercaptide or sodamide. Another very useful method for preparing the hydrolyzable silyl thioethers of the present invention comprises the addition of mercaptans to olefinically unsaturated hydrolyzable silanes using ultra-violet light irradiation as a catalyst for the reaction. The reaction can also be catalyzed by other free radical initiators, such as the organic peroxides.

From the foregoing description of the hydrolyzable silyl thioethers within the scope of the present invention, and from the described method of preparation, it is seen that compounds within the scope of the present invention include but are not limited to those listed below:

$CH_3SCH_2CH_2SiCl_3$
$(CH_3SCH_2CH_2)_2Si(OOCCH_3)_2$
$(CH_3SCH_2CH_2)_3SiOC_2H_5$
$(CH_3)(C_6H_5SCH_2CH_2CH_2)SiCl_2$
$(C_6H_5)(C_6H_5CH_2SCH_2CH_2CH_2)_2SiOCH_3$
cyclohexyl—$SCH_2CH_2SiCl_3$
$CH_3C_6H_4SCH_2(CH_3)CHSi(OC_2H_5)_3$
n—$C_4H_9SCH_2CH_2Si(OC_2H_5)_3$
$(CH_3)(CH_3SCH_2CH_2)Si(OC_2H_5)_2$
$(CH_3)(C_6H_5SCH_2CH_2)Si(OC_2H_5)_2$
$(CH_3)(C_6H_5SCH_2CH_2)SiCl_2$
$(CH_3)(C_{12}H_{25}SCH_2CH_2)Si(OC_2H_5)_2$
$(CH_3)(n—C_4H_5[C_2H_5]CHCH_2SCH_2CH_2)Si(OC_2H_5)_2$ The following examples are not intended as limitations of the scope of the present invention but serve to illustrate the method of preparation and properties of the hydrolyzable silyl thioethers within the scope of the present invention.

*Example 1*

A solution was prepared of 1.15 grams (0.05 mole) of sodium dissolved in 49.6 grams (0.55 mole) of n-butyl mercaptan and 95.2 grams (0.50 mole) of vinyl triethoxy silane. This solution was refluxed for 168 hours during which time the reaction temperature rose from 118 to 126° C. At the end of this time benzene was added and a solid which had formed on addition of the benzene was centrifuged off and the resulting solution was rectified. This rectification yielded 36.3 grams of vinyl triethoxy silane and 44.8 grams of 2(triethoxysilyl)ethyl butyl thioether having the formula (4)     n—$C_4H_9SCH_2CH_2Si(OC_2H_5)_3$ and having a density $D_4^{20}$ of 0.952 and a refractive index $n_D^{20}$ of 1.4422. The $MR_D$ was observed to be 77.91 as compared with the theoretical value of 77.54. Chemical analysis of the product showed it to contain 51.2 percent carbon, 10.3 percent hydrogen, 11.7 percent sulfur and 9.9 percent silicon as compared with the theoretical values of 51.38 percent carbon, 10.06 percent hydrogen, 11.43 percent sulfur, and 10.01 percent silicon.

*Example 2*

Equimolar amounts of methyl mercaptan and methylvinyl diethoxysilane were mixed and subjected to ultraviolet irradiation for a period of about 3 hours, during which time the temperature of the reaction mixture rose from room temperature to about 75° C. At the end of this time the reaction mixture was fractionally distilled to give a 95.5 percent yield of 2(methyldiethoxysilyl)ethyl methyl thioether having the formula (5)     $(CH_3)(CH_3SCH_2CH_2)Si(OC_2H_5)_2$ This material had a boiling point of 127.5 to 129° C. at 59 mm., a refractive index $n_D^{20}$ of 1.4454 and a density $D_4^{20}$ of 0.954. Chemical analysis of this material showed the presence of 46.2 percent carbon, 9.9 percent hydrogen, and 13.2 percent silicon, as compared with the theoretical values of 46.1 percent carbon, 9.67 percent hydrogen and 13.48 percent silicon.

*Example 3*

Following the procedure of Example 2, an equimolar mixture of phenyl mercaptan and methylvinyl diethoxysilane was irradiated with ultraviolet light for 2 hours to yield 79 percent of 2(methyldiethoxysilyl)ethyl phenyl thioether having the formula (6)     $(CH_3)(C_6H_5SCH_2CH_2)Si(OC_2H_5)_2$ This material had a boiling point of 155 to 156° C. at 4 mm. and was found to contain 57.7 percent carbon, 8.2 percent hydrogen, 11.1 percent silicon, and 11.7 percent sulfur as compared with the theoretical values of 57.7 percent carbon, 8.2 percent hydrogen, 10.4 percent silicon, and 11.9 percent sulfur.

*Example 4*

Following the procedure of Example 2, an equimolar mixture of phenyl mercaptan and methylvinyl dichlorosilane was irradiated for two hours with ultraviolet light to produce in a 67 percent yield 2(methyldichlorosilyl) ethyl phenyl thioether having the formula (7)     $(CH_3)(C_6H_5SCH_2CH_2)SiCl_2$ This material had a boiling point of 140.5 to 143° C. at 4 mm. and contained 43.7 percent carbon, 4.9 percent hydrogen, 11.0 percent silicon, and 12.6 percent sulfur, as compared with the theoretical values of 43.1 percent carbon, 4.8 percent hydrogen, 11.2 percent silicon, and 12.8 percent sulfur.

*Example 5*

Following the procedure of Example 2, an equimolar mixture of dodecyl mercaptan and methylvinyldiethoxysilane was irradiated for 3 hours with ultraviolet light to produce in a 78 percent yield 2(methyldiethoxysilyl)ethyl dodecyl thioether having the formula (8)     $(CH_3)(C_{12}H_{25}SCH_2CH_2)Si(OC_2H_5)_2$ This material had a boiling point of from 169 to 179° C. at 0.5 mm. and contained 63.2 percent carbon, 11.9 percent hydrogen, 7.9 percent silicon, and 8.8 percent sulfur as compared with the theoretical values of 63.0 percent carbon, 11.7 percent hydrogen, 7.8 percent silicon, and 8.9 percent sulfur.

*Example 6*

Following the procedure of Example 2, an equimolar mixture of 2-ethylhexyl mercaptan and methylvinyl diethoxysilane was irradiated for 1 hour by ultraviolet light to produce an 86 percent yield of 2(methyldiethoxysilyl) ethyl 2-ethylhexyl thioether having the formula (9)     $(CH_3)(n—C_4H_9[C_2H_5]CHCH_2SCH_2CH_2)Si(OC_2H_5)_2$ This material had a boiling point of from 133 to 135° C. at 2 mm. and contained 58.8 percent carbon, 11.4 percent hydrogen, 9.4 percent silicon, and 10.4 percent sulfur as compared with the theoretical values of 58.8 percent carbon, 11.2 percent hydrogen, 9.2 percent silicon, and 10.5 percent sulfur.

*Example 7*

The 2(methyldichlorosilyl)ethyl phenyl thioether of Example 4 is converted to the corresponding acetoxy derivative, 2(methyldiacetoxysilyl)ethyl phenyl thioether by refluxing one mole of the dichlorosilane with 2 moles of anhydrous sodium acetate in glacial acetic acid and recovering the diacetoxy compound by fractional distillation.

*Example 8*

As an illustration of the utility of the compounds of the present invention, one part, by weight, of the 2(methyldiethoxysilyl)ethyl methyl thioether of Example 2 was mixed with one part by weight of a dilute aqueous hydrochloric acid solution and the mixture was vigorously stirred. This resulted in a two-phase system with a lower oil phase and an upper aqueous phase. After separation of the oil phase from the aqueous phase the remaining water was stripped from the oil phase to yield an oil whose structure was indicated by chemical analysis and infrared analysis to consist essentially of methylthioethyl methyl siloxane units having the formula $$\begin{array}{c} CH_3 \\ | \\ S \\ | \\ CH_2 \\ | \\ CH_2 \\ | \\ -Si-O- \\ | \\ CH_3 \end{array}$$

This oil was useful in the lubrication of both steel on steel and naval bronze on steel.

As illustrated in Example 8, the hydrolyzable silyl thioethers of the present invention are useful in the preparation of silicone fluids having outstanding lubricity properties. In addition, these hydrolyzable silyl thioethers may be cohydrolyzed in a conventional manner with other hydrolyzable silanes to form organopolysiloxane oils, resins, and gums which are useful in the same applications in which other silicones are useful, e.g., as hydraulic fluids, molding compounds, wire insulation, and the like.

What I claim as new and desire to secure by Letters Patent of the United States is:

1. A hydrolyzable silyl thioether containing at least one silicon-bonded thioether radical consisting solely of a sulfur atom and carbon and hydrogen atoms, in which radical a divalent alkylene radical of from two to four carbon atoms joins the sulfur atom to the silicon atom, the said thioether radical being free of olefinic unsaturation, and at least one silicon-bonded hydrolyzable group selected from the class consisting of halogen atoms, alkoxy groups, aryloxy groups and acyloxy groups, with any remaining valences of silicon being satisfied by hydrocarbon radicals free of olefinic unsaturation.

2. Hydrolyzable silyl thioethers having the formula $$(RSR')_m Si(R'')_n (X)_{4-(m+n)}$$

where R and R'' represent hydrocarbon radicals free of olefinic unsaturation, R' is a divalent alkylene radical having from 2 to 4, inclusive carbon atoms, X is a hydrolyzable group selected from the class consisting of halogen atoms, alkoxy groups, aryloxy groups and acyloxy groups, $m$ is a whole number from 1 to 3, inclusive, $n$ is a whole number from 0 to 2, inclusive, and the sum of $m+n$ is at most 3.

3. 2(triethoxysilyl)ethyl butyl thioether having the formula $$n\text{---}C_4H_9SCH_2CH_2Si(OC_2H_5)_3$$

4. 2(methyldiethoxysilyl)ethyl methyl thioether having the formula $$(CH_3)(CH_3SCH_2CH_2)Si(OC_2H_5)_2$$

5. 2(methyldiethoxysilyl)ethyl phenyl thioether having the formula $$(CH_3)(C_6H_5SCH_2CH_2)Si(OC_2H_5)_2$$

6. 2(methyldichlorosilyl)ethyl phenyl thioether having the formula $$(CH_3)(C_6H_5SCH_2CH_2)SiCl_2$$

7. 2(methyldiethoxysilyl)ethyl dodecyl thioether having the formula $$(CH_3)(C_{12}H_{25}SCH_2CH_2)Si(OC_2H_5)_2$$

8. A new composition of matter having the formula $$RSCH_2CH_2Si(OR')_3$$

where R and R' are hydrocarbyl radicals taken from the group consisting of alkyl and aryl radicals.

References Cited in the file of this patent

UNITED STATES PATENTS 2,563,516    Burkhard ---------------- Aug. 7, 1951
2,835,690    Prober ------------------ May 20, 1958